(12) United States Patent
Murai

(10) Patent No.: US 6,961,042 B2
(45) Date of Patent: Nov. 1, 2005

(54) LIQUID CRYSTAL DISPLAY

(75) Inventor: Hiroyuki Murai, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 458 days.

(21) Appl. No.: 09/958,789

(22) PCT Filed: Nov. 30, 2000

(86) PCT No.: PCT/JP00/08477

§ 371 (c)(1),
(2), (4) Date: Jan. 17, 2002

(87) PCT Pub. No.: WO01/40857

PCT Pub. Date: Jun. 7, 2001

(65) Prior Publication Data

US 2002/0158993 A1    Oct. 31, 2002

(30) Foreign Application Priority Data

Dec. 3, 1999 (JP) .................................. 11-344832

(51) Int. Cl.[7] .............................................. G09G 3/36
(52) U.S. Cl. .......................................... 345/92; 345/87
(58) Field of Search ............................. 345/87–104, 92

(56) References Cited

U.S. PATENT DOCUMENTS

| 5,194,974 A | 3/1993 | Hamada et al. |
| 5,627,557 A | 5/1997 | Yamaguchi et al. |
| 6,266,038 B1 * | 7/2001 | Yoshida et al. ............... 345/92 |

FOREIGN PATENT DOCUMENTS

| EP | 1 003 150 | 5/2000 |
| JP | 5-173175 | 7/1993 |
| JP | 11-160676 | 6/1999 |
| JP | 11-326946 | 11/1999 |

* cited by examiner

Primary Examiner—Sumati Lefkowitz
Assistant Examiner—Srilakshmi K. Kumar
(74) Attorney, Agent, or Firm—Leydig, Voit & Mayer, Ltd.

(57) ABSTRACT

A liquid crystal display device driven with low power consumption while maintaining display quality includes first vertical scanning lines and horizontal scanning lines on a substrate in a matrix; first switching units connected to the horizontal scanning lines and controllable by the first vertical scanning lines; control capacitor elements for holding control signals on the horizontal scanning lines connected to the first switching units; and second switching units connecting pixel signal lines and pixel electrodes together to write potentials on the pixel signal lines into the pixel electrodes, the second switching units being connected to the control capacitor elements.

19 Claims, 17 Drawing Sheets

LIQUID CRYSTAL DISPLAY

TECHNICAL FIELD

The present invention relates to a liquid crystal display device for displaying images with liquid crystal, and particularly a liquid crystal display device for use in a portable information terminal or a mobile telephone, in which low power consumption is required.

BACKGROUND ART

Some kinds of personal computers and television sets use liquid crystal display devices for displaying still images and moving images. FIG. 14 shows a structure of a conventional color liquid crystal display device. In FIG. 14, 1001 indicates one pixel formed of three, i.e., R, B, and G, pixels. 1002 indicates a liquid crystal display portion including a large number of pixels arranged in rows and columns. 1003 indicates a vertical scanning circuit including a shift register circuit 1004 and a buffer circuit 1005, and can select one row in the liquid crystal display portion. 1006 indicates a horizontal scanning circuit including a shift register circuit 1007, a buffer circuit 1008, and a switch 1009 for applying a signal to one column in the liquid crystal display portion. 1010 and 1001 indicate a vertical scanning line and a signal line, which connect vertical scanning circuit 1003 and horizontal scanning circuit 1006 to each pixel, respectively. FIG. 15 is a circuit diagram showing one pixel of FIG. 14. In FIG. 15, 1101 indicates a thin film transfer (TFT), 1102 indicates a liquid crystal display element, and 1103 indicates a capacitor.

An operation will now be described. When a positive voltage is applied to vertical scanning line 1010, TFT 1101 is turned on to connect signal line 1011 to liquid crystal display element 1102 and capacitor 1103. Thereby, liquid crystal display element 1102 and capacitor 1103 are charged to a potential equal to that on signal line 1011. In a case of a so-called dot sequential drive, horizontal scanning circuit 1006 successively charges the respective column pixels in one row. After all the column pixels are scanned, vertical scanning circuit 1003 sets the voltage on vertical scanning line 1010 to zero or negative value so that TFT 1101 is turned off, and the voltages on liquid crystal display element 1102 and capacitor 1103 are maintained. In a similar manner, the subsequent rows are successively scanned. After vertical scanning circuit 1003 scanned all the rows (which will be referred to as "one frame"), the positive voltage is applied to vertical scanning line 1010 again, and the voltage is written from the signal line to liquid crystal display element 1102 and capacitor 1103. In this manner, all the pixels are successively written a frame at a time, and the display is performed.

Since the liquid crystal display device has the structure described above, it is necessary to maintain a voltage by the electrostatic capacitances of the liquid crystal display element and capacitor for a period (i.e., one frame period) from writing of the signal in one pixel to the next rewriting. However, the voltage lowers due to a finite resistivity of the liquid crystal, leakage in TFT and others, resulting in lowering of display quality, such as flicker. FIGS. 16(a) and 16(b) shows this state. FIG. 16(a) represents an operation with a usual frame frequency of 60 Hz. In this operation, one pixel is rewritten once for each frame period of 1/60 seconds. Therefore, the voltage lowering is small, and the reflectance (brightness) of the pixel does not change so that lowering of the display quality, such as flicker, and lowering of contrast does not occur.

A major portion of the power consumed in the liquid crystal display device is consumed by the powers consumed by the shift register circuits, which perform fast operations in vertical scanning circuit 1003, operating at a frequency of ((frame frequency)×(number of vertical scanning lines)) as well as horizontal scanning circuit 1006 operating at a frequency of ((frame frequency)×(number of vertical scanning lines)×(number of horizontal scanning lines)). For reducing the power consumption, it is effective to reduce the operation frequencies of these circuits or to operate them intermittently. FIG. 16(b) represents a case where the operation frequencies of the horizontal and vertical scanning circuits are lowered for reducing the power consumption. In this case, the rewriting time period (i.e., frame period) of the liquid crystal display element increase, and the voltage declines to an extremely large extent during such a long period. When the display is performed under such conditions, the voltage changes with time so that the reflectance (brightness) changes to a large extent, causing flicker. Also, the average voltage declines so that sufficient contrast cannot be achieved, resulting in low display quality.

An object of the invention is to provide a liquid crystal display device overcoming the above disadvantages, and particularly a liquid crystal display device operating with low power consumption without lowering display quality.

DISCLOSURE OF THE INVENTION

A liquid crystal display device of a first structure of the invention includes a plurality of first vertical scanning lines and a plurality of horizontal scanning lines arranged on a substrate in a matrix form; a first switching unit connected to the horizontal scanning lines and controllable by the first vertical scanning lines; a control capacitor element for holding a control signal on the horizontal scanning line connected to the first switching unit; and second switching unit for connecting a pixel signal line and a pixel electrode together to write the potential on the pixel signal lines to the pixel electrodes, the second switching unit being connected to the control capacitor element. Since this structure includes the switch, which is connected to the control element and the control capacitor element for holding the pixel select signal, and can write the reference potential to the pixel, the liquid crystal display device operating with low power consumption can be achieved.

In a liquid crystal display device of a second structure of the invention, the pixel electrode is connected to the two reference lines via independent switching units, respectively, and at least one of the switching units is a second switching unit controlled by the control capacitor element. According to this structure, the switching unit for writing the potential on the common line to the pixel is employed in addition to the switch for writing the reference potential. Therefore, a liquid crystal display device with good contrast can be achieved.

A liquid crystal display device of a third structure of the invention has the second structure, and further has such a structure that the second switching unit includes an n-type and p-type TFTs, and the TFTs are connected to the different reference line potentials, respectively. According to this structure, since the switching unit for writing the potential on the common line to the pixel is employed in addition to the switch for writing the reference potential, a liquid crystal display device with good contrast can be achieved.

A liquid crystal display device of a fourth structure of the invention has any one of the first to third structures, and further has a third switching unit controllable by a second vertical scanning line, and is connected in series between the second switching unit and the pixel electrode. According to this structure, the switch including the p-type TFT for writing the potential on the common line to the pixel is employed in addition to the switch for writing the reference potential. Therefore, the liquid crystal display device with good contrast can be achieved.

A liquid crystal display device of a fifth structure of the invention has any one of the first to third structures, and further has a third switching unit connected in series between the n-type TFT forming the second switching means and the pixel electrode, and fourth switching unit controllable by a third vertical scanning line, and is connected in series between the p-type TFT of the second switching unit and the pixel electrode. According to this structure, the switch, which is controlled by the vertical scanning circuit, is arranged in series with the switch for writing the reference potential or the potential on the common line. Therefore, a defect can be suppressed in the liquid crystal display device. According to this structure, the switch controlled by the third control line is arranged in series with the switch for writing the reference potential, and the switch controlled by the fourth control line is arranged in series with the switch for writing the potential on the common line. Therefore, it is possible to provide the liquid crystal display device which can perform a multi-level display operation in addition to the operation with low power consumption.

In a liquid crystal display device of a sixth structure of the invention, fifth switch unit controllable by the first vertical scanning line is connected in series between the n-type TFT of the second switching unit and the pixel electrode, and sixth switching unit controllable by the third vertical scanning line is connected in series between the n- and p-type TFTs of the second switching unit and the pixel electrode. According to this structure, it is possible to achieve a liquid crystal display device having a simple structure which can perform the multi-level display in addition to the operation with low power consumption.

A seventh structure of the invention has any one of the first to fifth structures, and further has such a structure that a drive circuit connected to the second vertical scanning line, dividing a row of externally supplied time-series binary control signals into signals corresponding to the pixel electrodes, so that the control signal corresponding to the pixel electrode can be held until the end of writing to the control capacitor element. According to this structure, the switch controlled by the vertical scanning line is arranged in series with the switch for writing the reference potential, and the switch controlled by the third control line is arranged in series with the switch for writing the reference potential and the switch for writing the potential on the common line. Therefore, it is possible to achieve the liquid crystal display device having a simple structure, which can produce a multi-level display in addition to the operation with low power consumption.

An eighth structure of the invention has any one of the first to seventh structures, and further has a reference potential on the pixel signal line set such that the potential written into the pixel electrode by the second switching unit is equal to a value obtained by adding or subtracting a liquid crystal drive voltage to or from the potential on an opposed substrate, and the potential on the common line is set such that the potential written into the pixel electrode by the second switching unit is equal to the potential on the opposed substrate. According to this structure, the reference potential and the potential on the common line are set to attain the maximum and minimum reflectances of the liquid crystal, respectively, so that the liquid crystal display can exhibit high contrast.

A ninth structure of the invention has any one of the first to eighth structures, and further has the pixel signal line connected by switching unit to a reference potential bus line for externally supplying the reference potential into the device, and the switching unit is configured to operate together with at least one of the first, second and third vertical scanning lines. According to this structure, the liquid crystal display device can have a power supply of a compact structure for generating the reference potential.

A tenth structure of the invention has any one of the third to eighth structures, and further has a time interval between the writing operations for the pixel electrode shorter than the time interval between the writing operations for the control capacitor element. According to this structure, the liquid crystal display device can produce a high-contrast display with low power consumption while eliminating flicker.

An eleventh structure of the invention has any one of the fourth to tenth structures, and further has a time interval between changes of the potential on the pixel signal line between the opposite sides of the potential on the opposite substrate longer than a time interval between the writing operations for the pixel electrode. This structure can achieve the liquid crystal display device having further reduced power consumption.

A twelfth structure of the invention has any one of the first to eleventh structures, and further has a pixel electrode for one pixel divided into a plurality of pixel electrodes, and respective first switching units connected to the first vertical scanning line and the horizontal scanning line, the control capacitor element for holding the control signal on the horizontal scanning line connected to the switching unit, and the second switching unit for writing the potential of the pixel signal to the pixel electrode for each of the pixel electrodes. This structure can achieve a liquid crystal display device capable of multi-level display.

A thirteenth structure of the invention has the twelfth structure, and further at least one of the plurality of divided pixel electrodes has an area different from those of the other pixel electrodes. According to this structure, the liquid crystal display device can produce a display with further increased levels.

A fourteenth structure has any one of the first to thirteenth structures, and the pixel electrode is a metal film, and is reflective. It is possible to achieve the liquid crystal display device of the reflection type operating with extremely low power consumption.

BEST MODE FOR CARRYING OUT THE INVENTION

Figure 1:
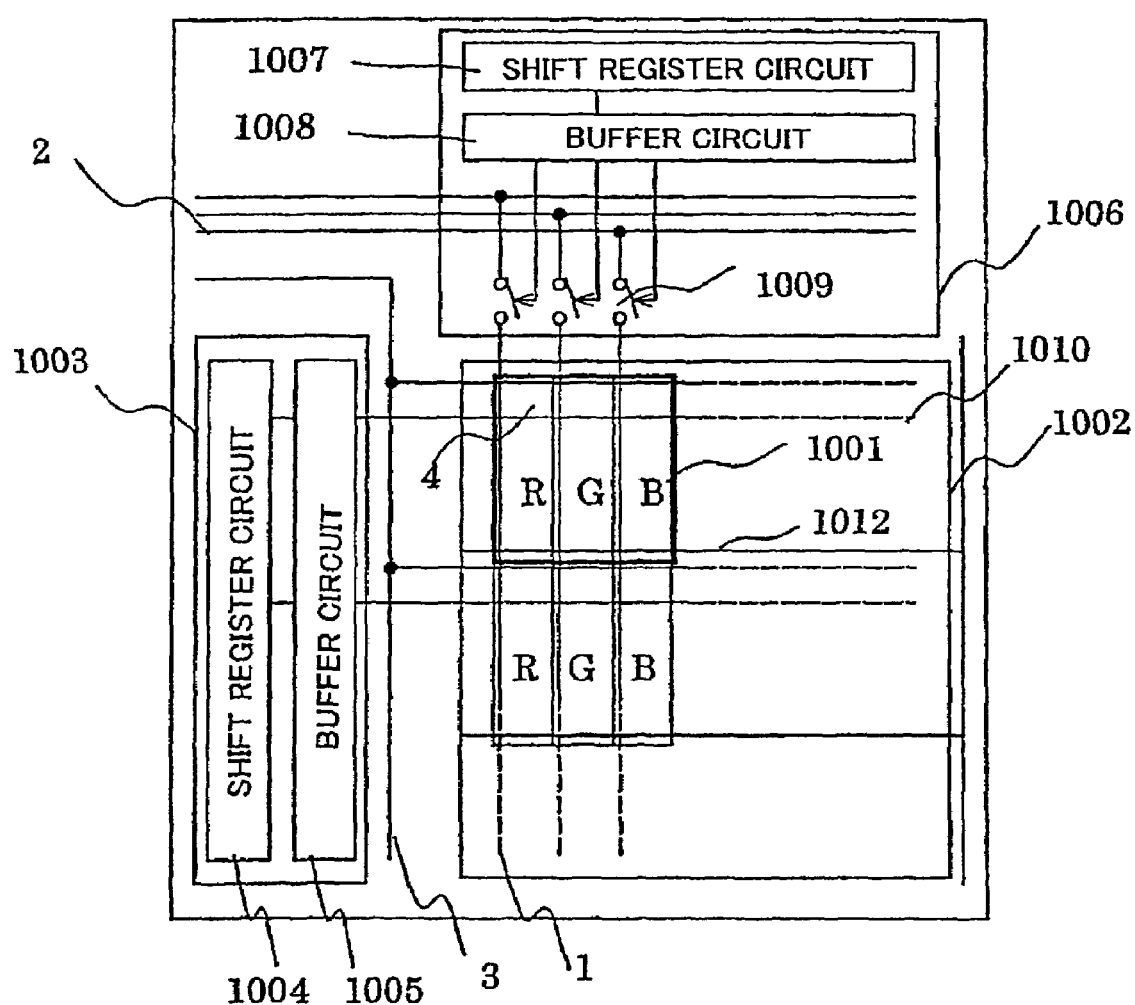
FIG. 1 shows a structure of a drive circuit of a liquid crystal display device according to a first embodiment of the invention.

Embodiments of the invention will now be described with reference to the drawings. In the drawings, the same parts and portions bear the same reference numbers, and description thereof is not repeated.

First Embodiment

Figure 2A:
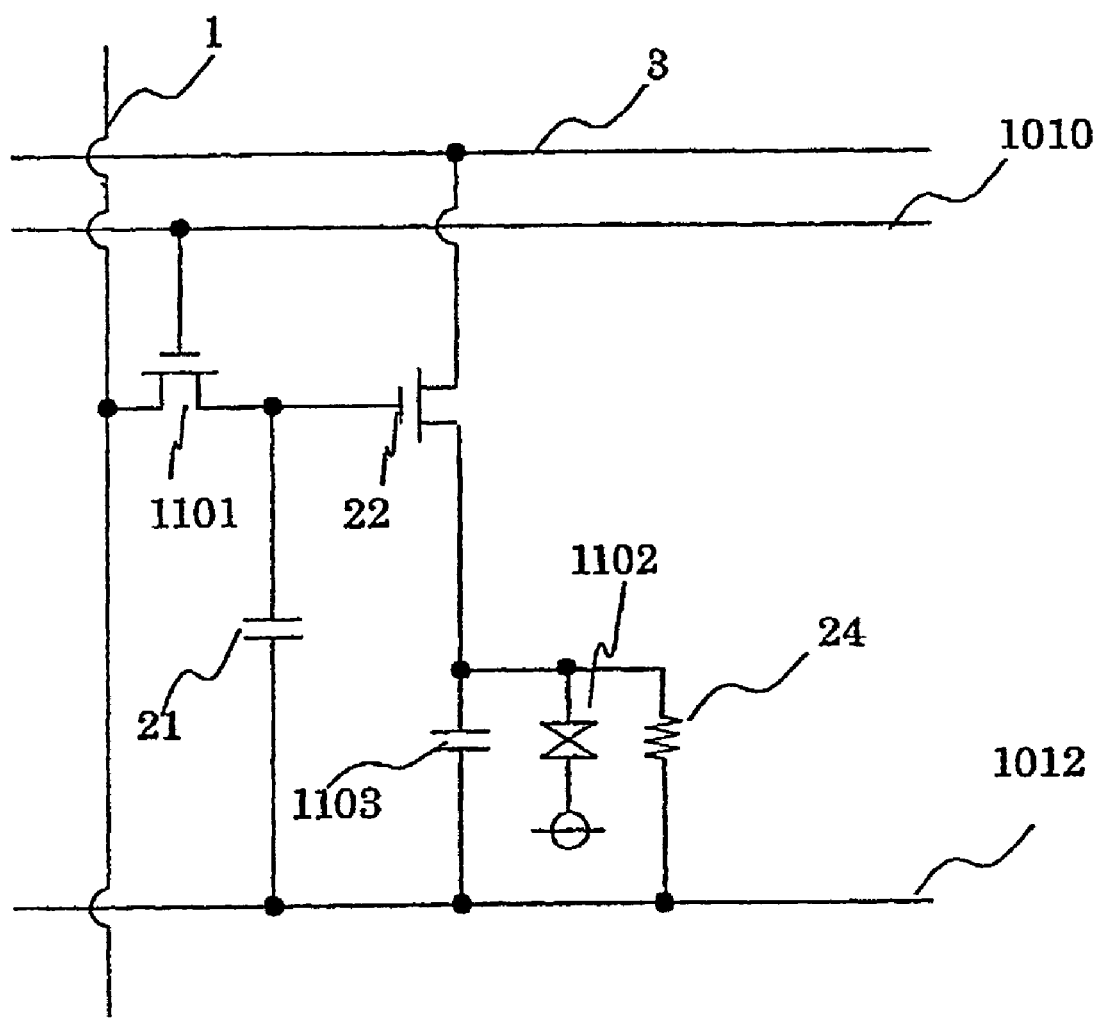
FIGS. 2(a) and 2(b) are circuit diagrams showing a drive circuit of the liquid crystal display device according to first and second embodiments of the invention.

FIG. 1 shows a structure of a first embodiment of a liquid crystal display device according to the invention. In FIG. 1, 1 indicates a horizontal scanning line, 2 indicates a data signal line, 3 indicates a pixel signal line and 4 indicates a pixel. FIG. 2(a) is a circuit diagram showing a structure of one pixel. In FIG. 2(a), 21 indicates a control capacitor element (i.e., capacitor element for control), 22 indicates a second n-type TFT (second switching means) and 24 indicates a resistance element.

An operation will now be described. As already described, vertical and horizontal scanning circuits 1003 and 1006 cooperate to select one pixel, as already described. In the invention, horizontal scanning line 1 including the pixel to be turned on is supplied with a positive voltage, e.g., of 5 V from data signal line 2 via switch 1009 selected by horizontal scanning circuit 1006 so that control capacitor element 21 is charged with a positive voltage on horizontal scanning line 1 via TFT 1101. In this state, control capacitor element 21 is connected to second n-type TFT 22 so that second n-type TFT 22 is turned on, and liquid crystal display element 1102 and capacitor 1103 are connected only to pixel signal line 3 (first reference line), and are charged with the voltage on pixel signal line 3. In a so-called dot sequential drive, vertical scanning circuit 1003 sets the voltage on vertical scanning line 1010 to zero or a negative value after all the column pixels in one row are scanned. Thereby, TFT 1101 is turned off to hold the voltage on control capacitor element 21, and n-type TFT 22 is kept on so that connection of liquid crystal display element 1102 and capacitor 1103 to pixel signal line 3 is always kept.

Figure 16A:
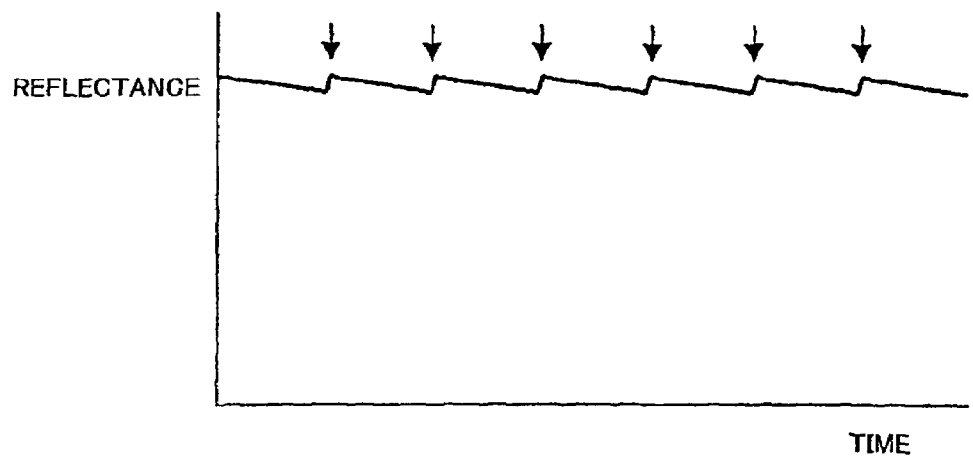
FIGS. 16(a) and 16(b) are waveform diagrams showing an operation of the drive circuit of the liquid crystal display device in the prior art.
Figure 16B:
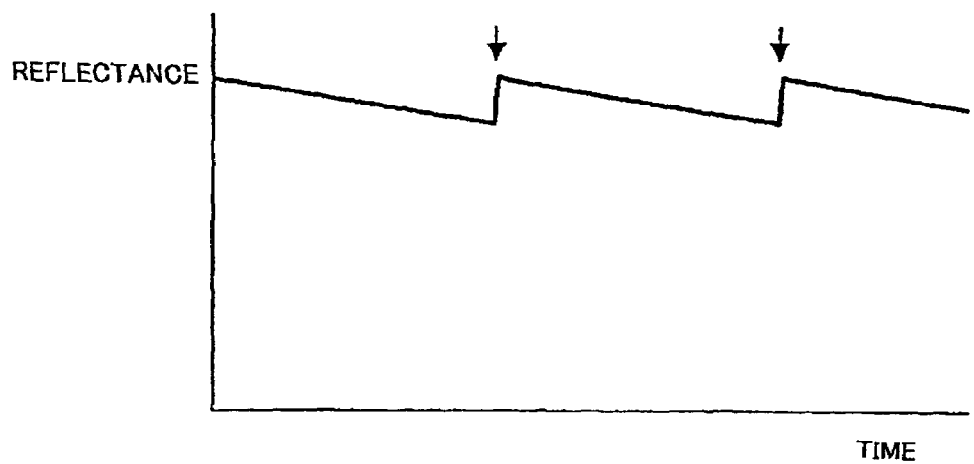

After vertical scanning circuit 1003 scans all the rows, a positive voltage is applied to vertical scanning line 1010 again, and the voltage is written into control capacitor element 21 from horizontal scanning line 1. In the first embodiment of the invention, the power consumption may be reduced by lowering the operation frequencies of the horizontal and vertical scanning circuits to increase the rewriting time interval of control capacitor element 21. In this case, the voltage on control capacitor element 21 declines with time due to leakage. However, this voltage is used for turning on n-type TFT 22. As long as this voltage is higher than a so-called threshold voltage of n-type TFT 22, n-type TFT 22 is kept on so that the connection of liquid crystal display element 1102 and capacitor 1103 to pixel signal line 3 is maintained. Therefore, a change in reflectance (brightness), e.g., shown in FIG. 16(b), does not occur. For the pixel in the off state, corresponding second n-type TFT 22 is off so that a current does not flow from pixel signal line 3, and the voltages on liquid crystal display element 1102 and capacitor 1103 are fixed by resistance element 24 to common line 1012 (second reference line). In this case, the reference potential on pixel signal line 3 is set such that the potential written to the pixel electrode is equal to a value obtained by adding or subtracting the liquid crystal drive voltage to or from the voltage on the opposed substrate. Therefore, it provides the maximum value (minimum value in the normally white mode) of the reflectance of the liquid crystal. At the same time, the potential on common line 1012 is set such that the potential written to the pixel electrode may be equal to the potential on the opposed substrate, and therefore it provides the minimum value (maximum value in the normally white mode) of the reflectance of the liquid crystal. Accordingly, the maximum contrast can be achieved by connection to pixel signal line 3 and common line 1012.

In this embodiment as described above, it is possible to achieve the liquid crystal display device, which allows lowering of the operation frequencies of the vertical and horizontal scanning circuits as well as intermittent driving of the vertical and horizontal scanning circuits, and can operate with low power consumption without impairing the display quality.

Second Embodiment

Figure 2B:
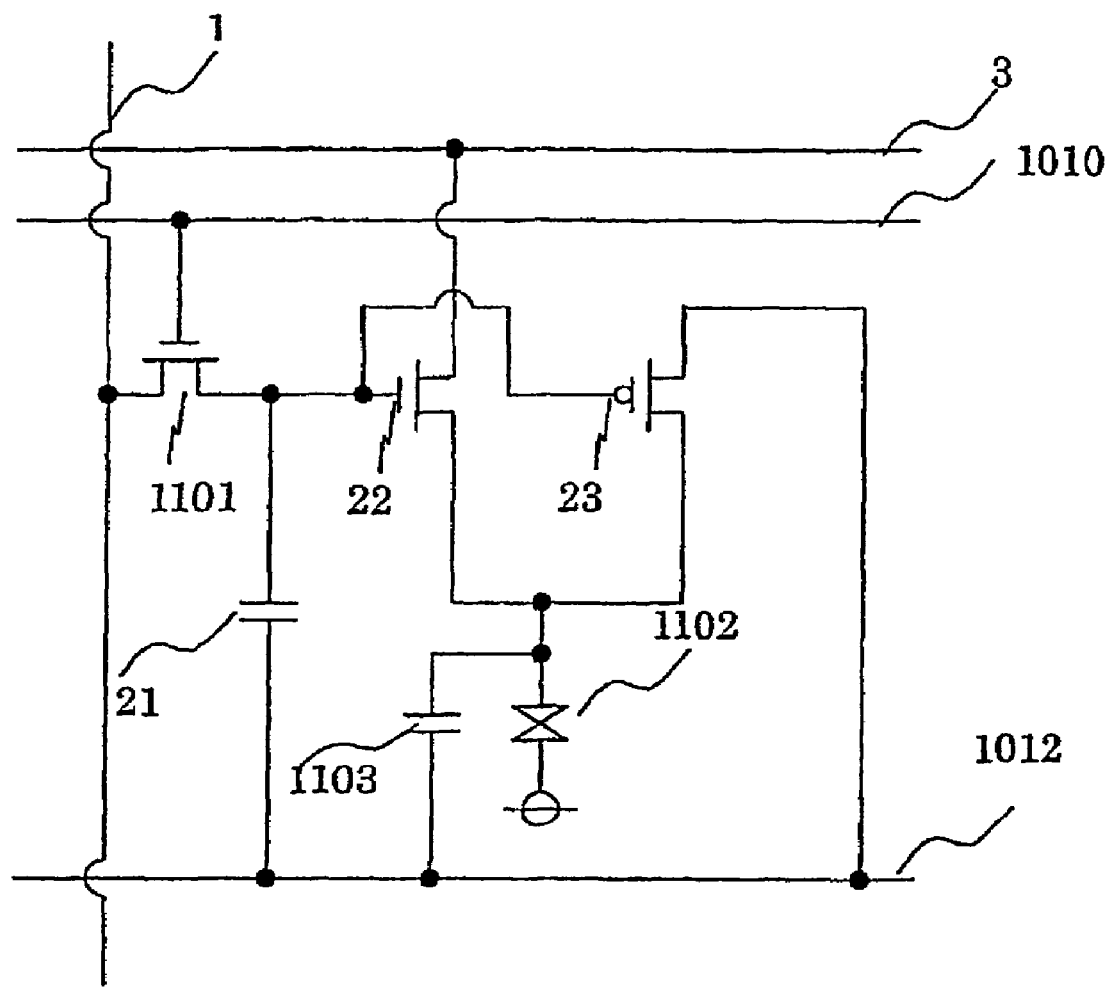

FIG. 2(b) shows a circuit of one pixel in a second embodiment of the invention. In FIG. 2(b), 23 indicates a p-type TFT.

An operation will now be described. In a second embodiment, a positive voltage (e.g., of 5 V) is applied to horizontal scanning line 1 of the pixel to be turned on so that control capacitor element 21 is charged with the positive voltage on horizontal scanning line 1 via TFT 1101. Since control capacitor element 21 is connected to second n-type TFT 22, second n-type TFT 22 is turned on. Meanwhile, p-type TFT 23 is supplied with a positive voltage, and therefore is off so that liquid crystal display element 1102 and capacitor 1103 are connected only to pixel signal line 3, and are charged with the voltage on pixel signal line 3, as already described.

In this state, since a zero or negative voltage (e.g., −2 V) is applied to horizontal scanning line 1 for the pixel in the off state, control capacitor element 21 is charged with the zero or negative voltage on horizontal scanning line 1 via TFT 1101. In this state, control capacitor element 21 is connected to second n-type TFT 22, which is off. At this time, however, p-type TFT 23 is supplied with the zero or negative voltage, and therefore is on. Therefore, liquid crystal display element 1102 and capacitor 1103 are connected to only common line 1012, and are fixed to the voltage on common line 1012. In this second embodiment, n-type TFT 22 and p-type TFT 23 are connected in a complementary manner so that the liquid crystal voltages for performing black display and white display can be reliably written, and display with high contrast can be achieved.

For the pixel in the off state, liquid crystal display element 1102 and capacitor 1103 are connected to common line 1012 via p-type TFT 23 so that the reflectance of the pixel in the off state can be completely kept low because charging from pixel signal line 3, which may be caused by leakage from n-type TFT or the like, does not occur. Therefore, the contrast can be kept sufficiently high, and it is possible to achieve the liquid crystal display device, which allows lowering of the operation frequencies of the vertical and horizontal scanning circuits as well as the intermittent drive of the vertical and horizontal scanning circuits without lowering the display quality, and can operate with low power consumption.

In the second embodiment, n-type TFT 22 and p-type TFT 23 are included in a second switching unit and are complementary to each other. However, various means for reliably supplying two kinds of reference voltages to the liquid crystal display element can be used.

Third Embodiment

Figure 3:
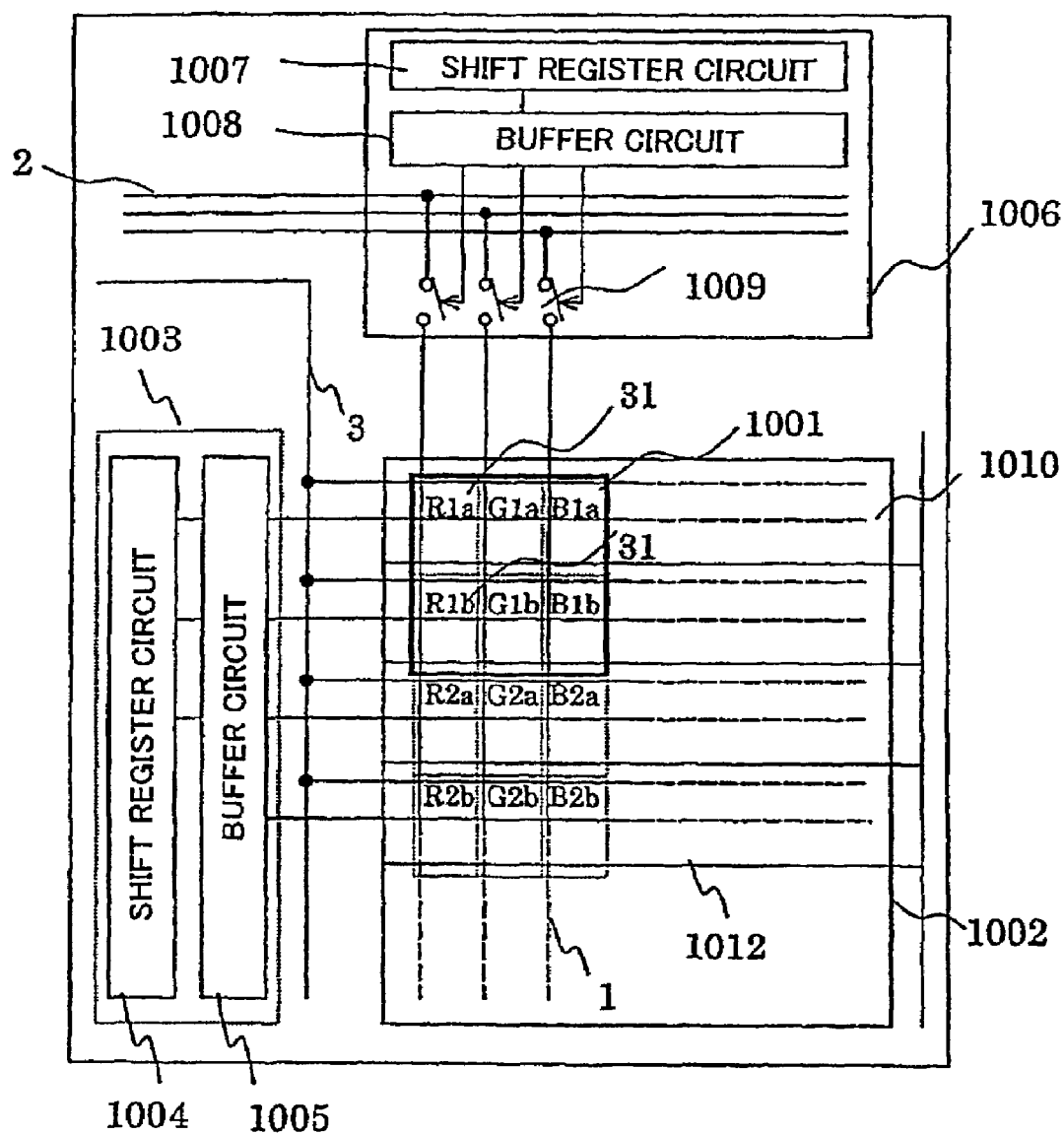
FIG. 3 shows a third embodiment of the invention.

FIG. 3 shows a structure of a third embodiment of the invention. In FIG. 3, 31 indicates a pixel including sub-pixels R1*a* and R1*b*. In this case, at least one circuit, which is the same as that shown in FIG. 2(*a*), is provided for each sub-pixel.

An operation will now be described. Owing to the circuit shown in FIGS. 2(*a*) and 2(*b*), as already described, it is possible to provide a liquid crystal device, which allows lowering of the operation frequencies of the vertical and horizontal scanning circuits as well as the intermittent operation thereof without lowering the display quality, and can operate with low power consumption. In this embodiment, each pixel includes the two sub-pixels, each of which is provided with an independent circuit, and therefore can be controlled independently of each other. Therefore, display at multi-levels can be performed.

Figure 4:
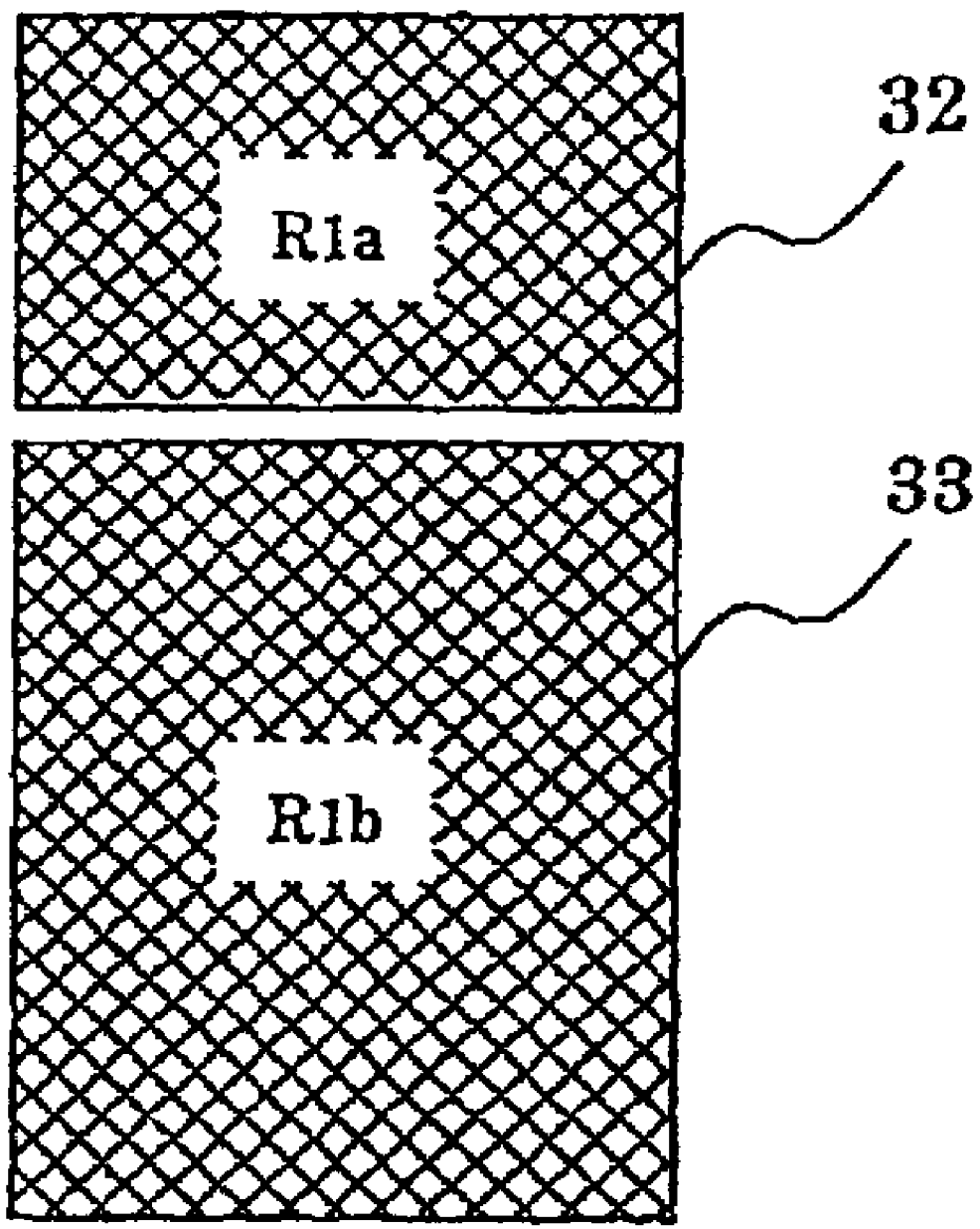
FIG. 4 shows a structure of a drive circuit of a liquid crystal display device according to the third embodiment of the invention.

FIG. 4 shows electrode areas of the sub-pixels. In FIG. 4, 32 indicates one (R1*a*) of sub-pixels, and 33 indicates the other sub-pixel R1*b*. Sub-pixels R1*a* and R1*b* have different electrode areas, respectively. When either of sub-pixels R1*a* and R1*b* is turned on independently of the other, display at different levels can be performed owing to the different turn-on areas so that display at further increased levels can be performed. The electrode may be formed of a metal film, whereby the liquid crystal display device of the reflection type can be achieved.

Fourth Embodiment

Figure 5:
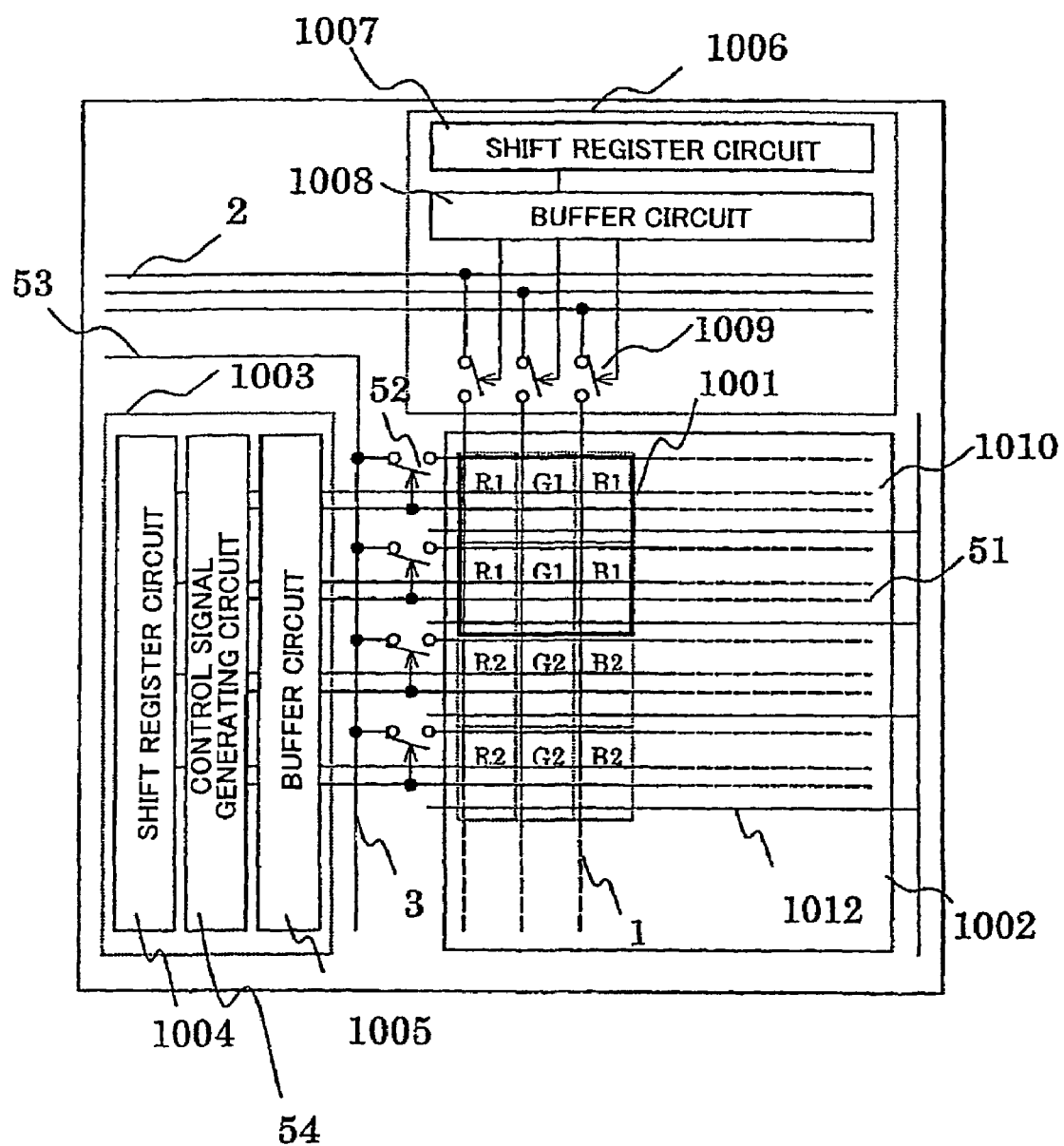
FIG. 5 shows a structure of a drive circuit of a liquid crystal display device according to a fourth embodiment of the invention.
Figure 6:
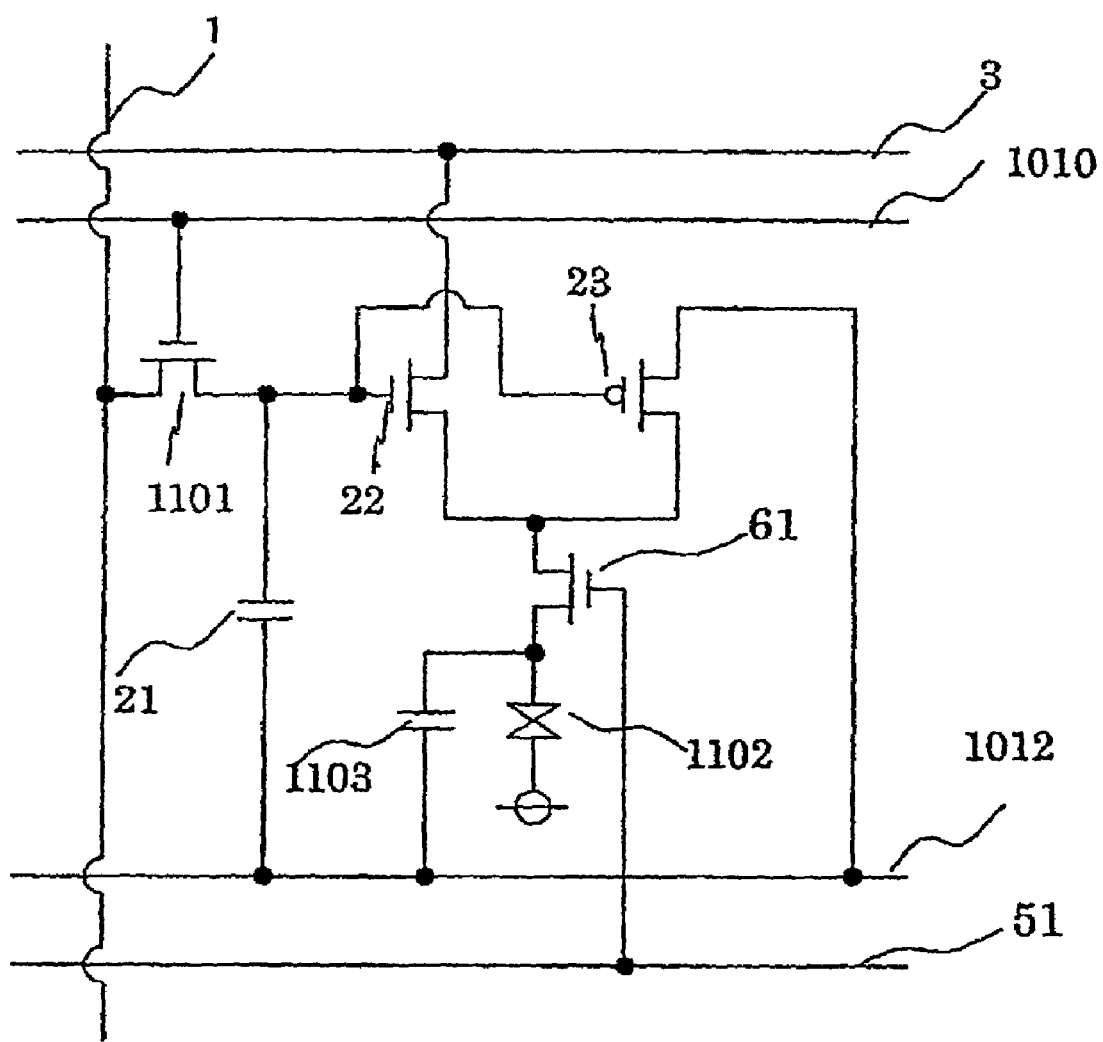
FIG. 6 is a circuit diagram showing the drive circuit of the liquid crystal display device according to the fourth embodiment of the invention.

FIG. 5 shows a structure of a fourth embodiment of the invention. In FIG. 5, 51 indicates a second vertical scanning line A, and 52 indicates a switching element, which is provided in a one-to-one relationship for each of pixel signal lines 3 divided corresponding to the respective rows for arrangement in liquid crystal display portion 1002, and is controlled by a second vertical scanning line A51. 53 is a reference potential bus line, which is connected to all switching elements 52 for applying the potential to pixel signal line 3 via switching element 52. FIG. 6 is a circuit diagram of one pixel (sub-pixel) in the fourth embodiment. 61 indicates a third n-type TFT (third switching unit), which is connected in series to second n-type TFT 22 to form a path extending from pixel signal line 3 to liquid crystal display element 1102 and capacitor 1103. Third n-type TFT 61 is also connected in series to p-type TFT 23 to form a path extending from common line 1012 to liquid crystal display element 1102 and capacitor 1103.

An operation will now be described. Horizontal and vertical scanning lines 1 and 1010 selectively turn on/off the pixel. As already described, control capacitor element 21 maintains the on/off state of second n-type TFT 22 and third p-type TFT 23. Third n-type TFT 61 is controlled by second vertical scanning line A51, and is turned on only when the positive voltage is applied to second vertical scanning line 51. When turned on, it connects pixel signal line 3 to liquid crystal display element 1102 and capacitor 1103, and also connects common line 1012 to liquid crystal display element 1102 and capacitor 1103. As already shown in FIG. 5, pixel signal line 3 is connected via switching element 52, which is controlled by second vertical scanning line A51 similarly to third n-type TFT 61. When the positive voltage is placed on second vertical scanning line A51 and third n-type TFT 61 is on, the voltage is also placed on pixel signal line 3 so that liquid crystal display element 1102 and capacitor 1103 are charged with the voltage on pixel signal line 3 when the on state is selected, and are charged with the voltage on common line 1012 again when the off state is selected.

Since the fourth embodiment has the structure described above, only vertical scanning circuit 1003, which operates with a relatively low frequency and low power consumption, is driven to drive only second vertical scanning line A51 after stopping the horizontal and vertical scanning lines 1 and 1010 provided for selecting the on and off states for each pixel. Thus, the time intervals between the write operations for liquid crystal display element 1102 and capacitor 1103 are further reduced by control capacitor element 21. Thereby, liquid crystal display element 1102 and capacitor 1103 are recharged. The potential on pixel signal line 3 is required to be inverted with respect to that on the opposite substrate for preventing such a situation that the liquid crystal is always subjected to the potential in the same direction. By increasing the time interval between the writing operations for the pixel electrode, the times of the potential inversion are reduced, and thereby the power for charging pixel signal line 3 can be reduced. Accordingly, the change in reflectance (brightness) can be small owing to the low power consumption, and the lowering of display quality such as flicker and low contrast can be prevented.

In the first and second embodiments, all the pixels are simultaneously connected to pixel signal line 3 or common line 1012. If short-circuit occurs in the liquid crystal display element or capacitor of a certain pixel, the voltage on pixel signal line 3 lowers, which affects the whole display. In this embodiment, connection is made only in one row by pixel signal line 3 at a certain time. Therefore, even if short-circuit occurs in the liquid crystal display element or capacitor of a certain pixel, a failure occurs only in display by one row of the pixels, and thus a failure exceeding a so-called line defect does not occur. This improves the yield.

Fifth Embodiment

Figure 7:
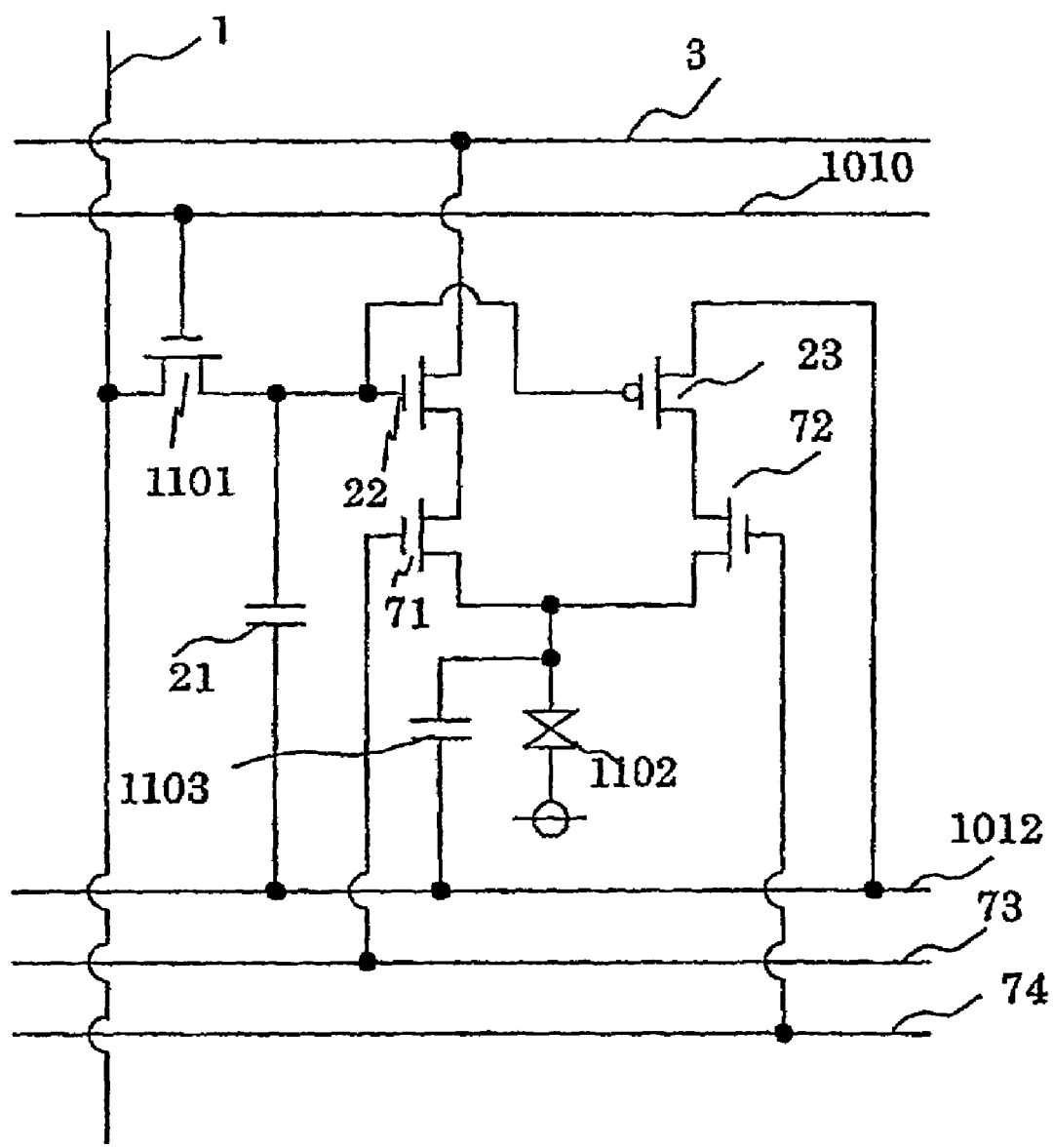
FIG. 7 is a circuit diagram showing a drive circuit of a liquid crystal display device of a fifth embodiment of the invention.

FIG. 7 is a circuit diagram of one pixel (sub-pixel) in a fifth embodiment. In FIG. 7, 71 indicates an n-type TFT (third switching unit), which is connected in series to second n-type TFT 22 to form a path extending from pixel signal line 3 to liquid crystal display element 1102 and capacitor 1103. 72 indicates an n-type TFT (fourth switching unit), which is connected in series to p-type TFT 23 to form a path extending from common line 1012 to liquid crystal display element 1102 and capacitor 1103. 73 indicates a second vertical scanning line B for controlling switching of n-type TFT 71. 74 indicates a third vertical scanning line for controlling switching of n-type TFT 72.

An operation will now be described. First, description will now be given on the case where second and third vertical scanning lines 73 and 74 operate simultaneously. In this case, the operation is performed similarly to the third embodiment. By operating the second and third vertical scanning lines B73 and 74, the pixel in the on or off state, which is determined by the voltage on control capacitor element 21, is recharged to attain a predetermined state. Therefore, the change in reflectance (brightness) can be small owing to the low power consumption, and the lowering of display quality such as flicker and low contrast can be prevented. This is referred to as the low power consumption mode.

In a normal mode, fast moving pictures or the like are displayed at a rate of tens of frames per second, and the states of pixels always change between the on and off states (so that the control capacitor elements in the pixels must be always rewritten). In this mode, an analog voltage is applied to pixel signal line 3, and is written into liquid crystal display element 1102 and capacitor 1103 via second n-type TFT 22 and n-type TFT 71 so that the display at multi-levels depending on the levels of the analog voltage can be performed. FIGS. 8(a)–8(e) are time charts showing a change in waveform applied to each control line, with time, in the normal operation mode. In a waveform shown in FIG. 8(a), a positive voltage pulse is applied to vertical scanning line 1010 and second vertical scanning line B73 to select the pixels in one horizontal line or row, and TFT 1101 and n-type TFT 71 are on. The signal on horizontal scanning line 1 having a waveform shown in FIG. 8(c) rises simultaneously with the rising of the positive pulses on vertical scanning line 1010 and second vertical scanning line B73, and second n-type TFT 22 is turned on so that liquid crystal display element 1102 and capacitor 1103 are connected to pixel signal line 3. Since pixel signal line 3 is supplied with the voltage pulse, which makes a stepwise change with time as shown in FIG. 8(b), the voltages on liquid crystal display element 1102 and capacitor 1103 change in the corresponding manner as shown in FIG. 8(e). When the signal on horizontal scanning line 1 changes from a positive voltage to a zero or negative voltage, second n-type TFT 22 is turned off, and liquid crystal display element 1102 and capacitor 1103 are disconnected from pixel signal line 3. Therefore, even when the voltage on pixel signal line 3 changes, the voltage on liquid crystal display element 1102 and capacitor 1103 (i.e., the voltage on the pixel electrode) is fixed to the voltage which appeared at the time of disconnection as shown in FIG. 8(e), and the pixel exhibits the reflectance corresponding to this voltage. In the normal mode, third vertical scanning line 74 is fixed to a zero or negative potential as shown in FIG. 8(d).

According to the fifth embodiment of the invention, as described above, the reflectance corresponding to the levels of the stepwise voltage can be produced in accordance with the timing of changing the signal on horizontal scanning line 1 to the zero or negative voltage, and the multi-level display can be achieved in the normal mode. Thereby, in the case of displaying, e.g., still images, which do not require the change between the on and off states of the pixels, the device is driven in the low power consumption mode, and the sub-pixels are used for achieving multilevel display. In the case of displaying, e.g., moving images by always changing pixels between the on and off states, the liquid crystal display device is driven in the normal mode, and can perform the multi-level display owing to the stepwise voltage applied to pixel signal line 3.

Sixth Embodiment

Figure 9:
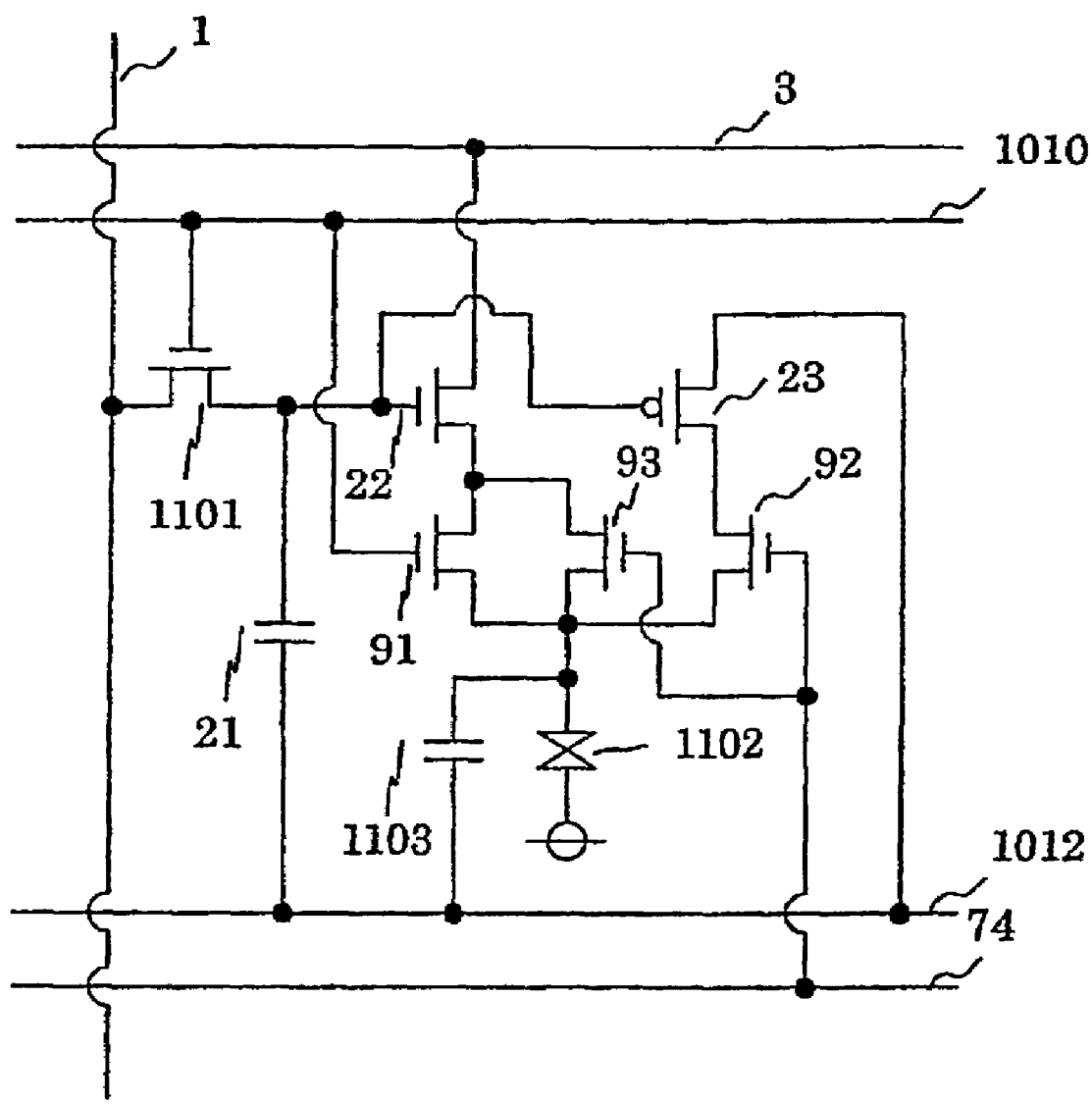
FIG. 9 is a circuit diagram showing a drive circuit of a liquid crystal display device of a sixth embodiment of the invention.

FIG. 9 is a circuit diagram showing a pixel (sub-pixel) in a sixth embodiment of the invention. In FIG. 9, 91 indicates an n-type TFT (fifth switching unit), which is connected in series to second n-type TFT 22 to form a path extending from pixel signal line 3 to liquid crystal display element 1102 and capacitor 1103. 92 and 93 indicate an n-type TFT (sixth switching unit), connected in series to second n-type TFT 22 to form a path extending from pixel signal line 3 to liquid crystal display element 1102 and capacitor 1103, and controlled by third vertical scanning line 74.

Figure 8:
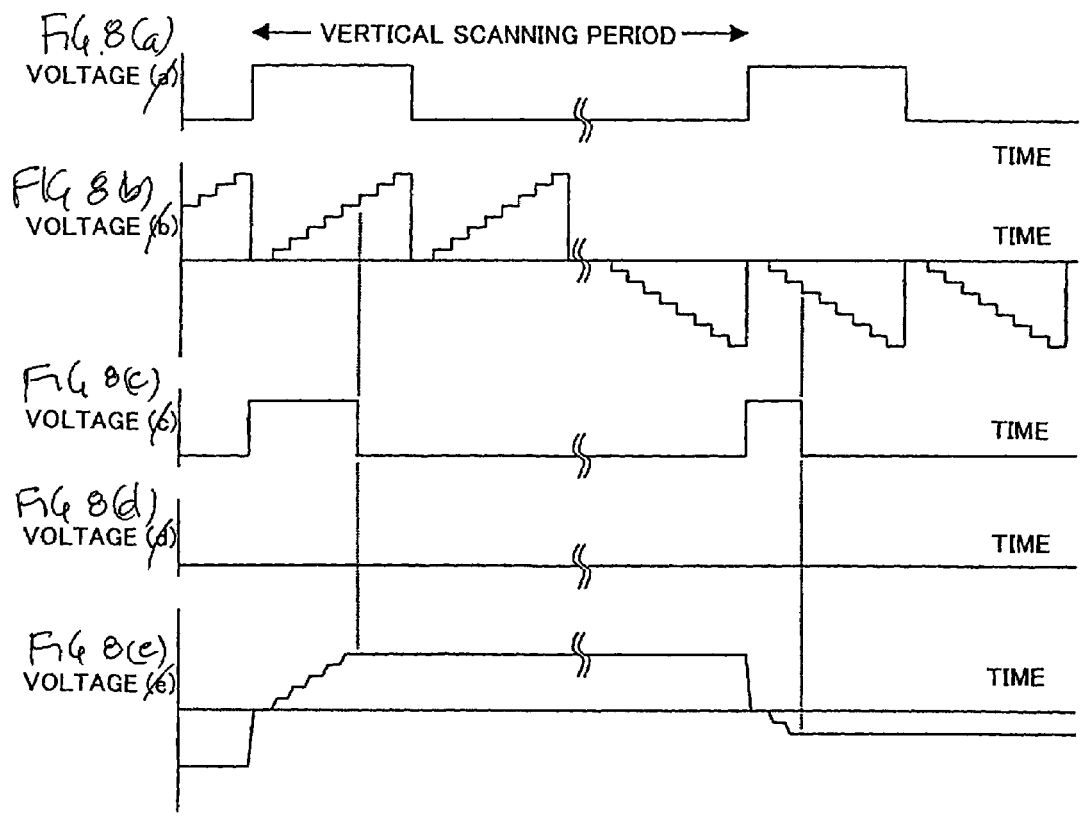
FIGS. 8(a)–8(e) are waveform diagrams showing a circuit operation of the fifth embodiment of the invention.

An operation will now be described. In the low power consumption mode, third vertical scanning line 74 operates to turn on n-type TFTs 92 and 93. Therefore, liquid crystal display element 1102 and capacitor 1103 are connected to either pixel signal line 3 or common line 1012 depending on the on or off states determined by the voltage on control capacitor element 21, and are recharged to the predetermined state. Therefore, the change in reflectance (brightness) can be small owing to the low power consumption, and the lowering of display quality such as flicker and low contrast can be prevented. In the normal mode, vertical scanning line 1010 simultaneously controls TFT 1101 and n-type TFT 91, and a positive voltage pulse is applied to vertical scanning line 1010 to select the pixels on one horizontal line so that TFTs 1101 and n-type TFTs 91 on the selected horizontal line are turned on. The signal on horizontal scanning line 1 rises simultaneously with the rising of the positive voltage pulse on vertical scanning line 1010, and second n-type TFT 22 is also turned on so that liquid crystal display element 1102 and capacitor 1103 are connected to pixel signal line 3. Since pixel signal line 3 is supplied with the voltage pulse changing stepwise with time as shown in FIG. 8, the voltages on liquid crystal display element 1102 and capacitor 1103 also change in accordance with the stepwise change. When the signal on horizontal scanning line 1 is changed from the positive voltage to the zero or negative voltage, second n-type TFT 22 is turned off to disconnect liquid crystal display element 1102 and capacitor 1103 from pixel signal line 3. The voltages on liquid crystal display element 1102 and capacitor 1103 are fixed to the voltage, which was appeared at the time of disconnection, and the pixel exhibits the reflectance corresponding to this voltage so that the reflectance corresponding to the levels of the stepwise voltage can be produced in accordance with the timing of changing the signal on horizontal scanning line 1 to the zero or negative voltage.

In the sixth embodiment, as described above, the normal mode is achieved only by one vertical scanning line 1010, and the low consumption mode is achieved by third vertical scanning line 74 so that the required scanning lines can be small in number. Therefore, a failure due to line breakage can be suppressed, which improves the yield. Since the pixels (sub-pixels) can be arranged at a high density, high-resolution display can be performed.

Seventh Embodiment

Figure 10:
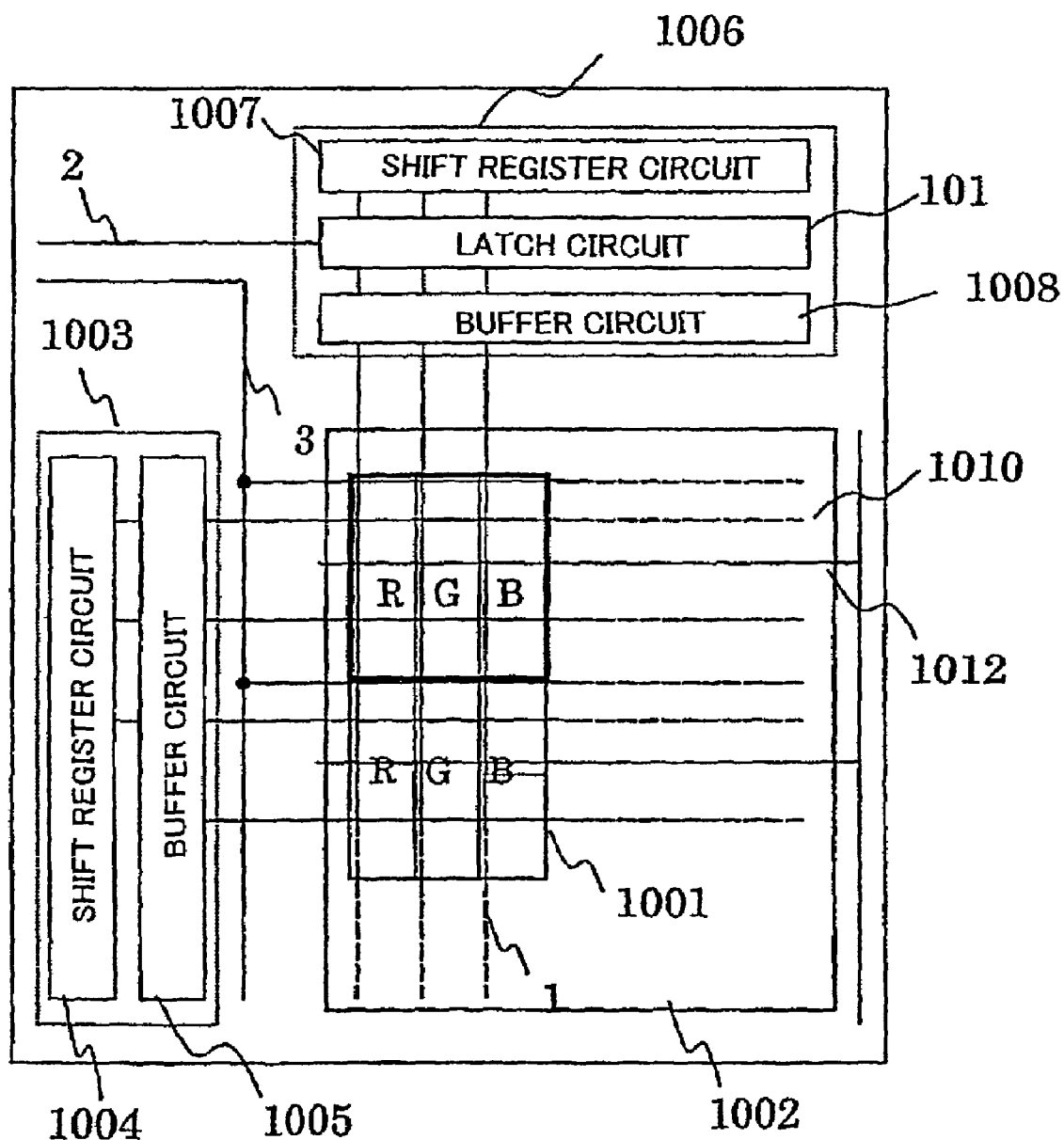
FIG. 10 shows a structure of a drive circuit of a liquid crystal display device of a seventh embodiment of the invention.

FIG. 10 shows a structure of a seventh embodiment of the invention, in which a latch circuit 101 is used for forming horizontal scanning circuit 1006. Latch circuit 101 is configured to divide a pulse signal row (time-series binary control signals), which is supplied from data signal line 2 for selecting the horizontal scanning line, in accordance with the pixels.

Eighth Embodiment

Figure 11:
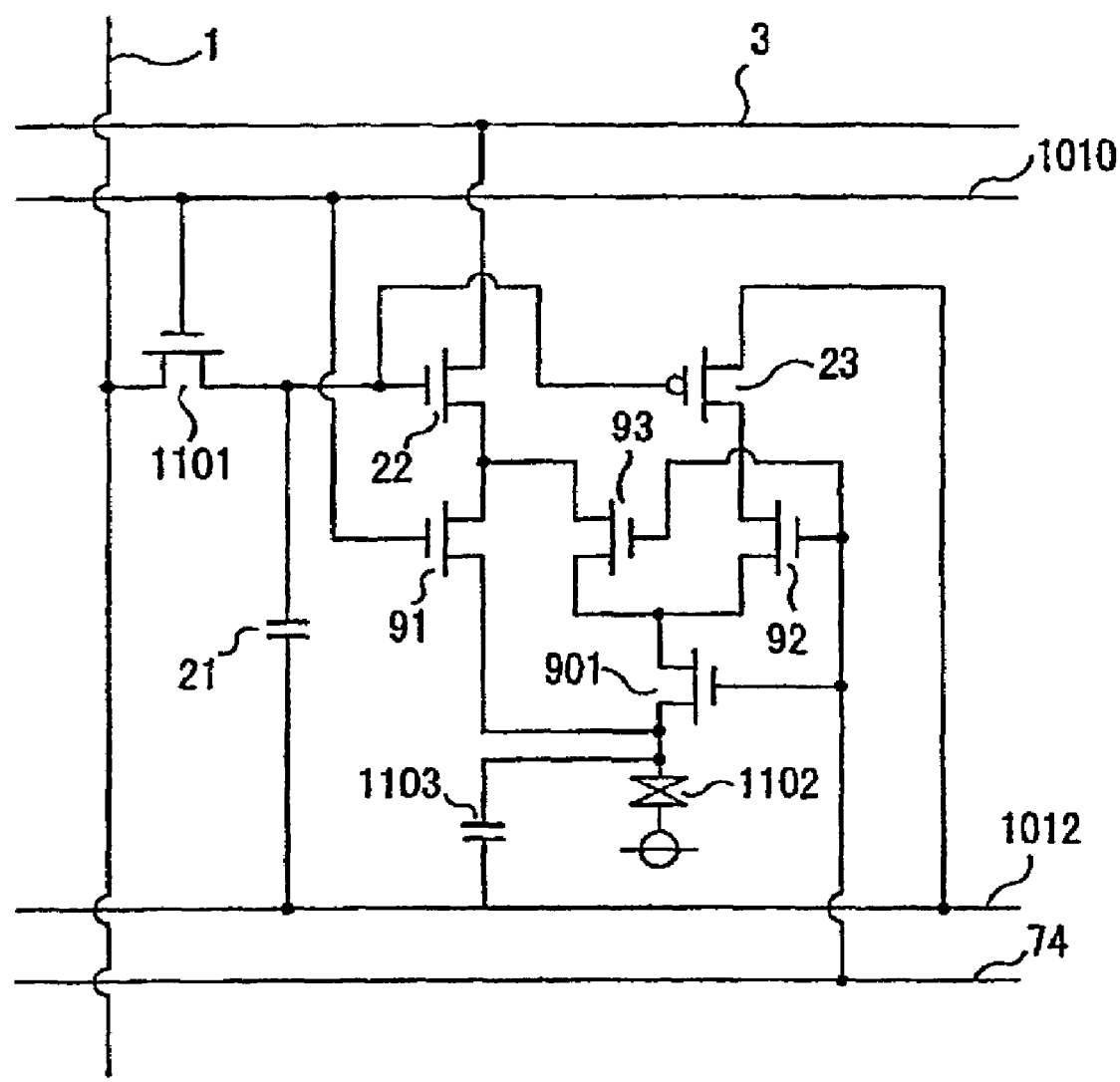
FIG. 11 shows a structure of a drive circuit of a liquid crystal display device of an eighth embodiment of the invention.

FIG. 11 is a circuit diagram showing one pixel (sub-pixel) in an eighth embodiment. The eighth embodiment is a further improvement of the sixth embodiment shown in FIG. 9. In FIG. 11, 901 indicates an n-type TFT, which is arranged in a series path extending from liquid crystal display element 1102 and capacitor 1103 to n-type TFT 92 (fourth switching unit), and is also arranged in series with respect to n-type TFT 93 (sixth switching unit). Structures other than the above are the same as those in FIG. 9.

An operation will now be described. In the low power consumption mode, third vertical scanning line 74 operates to turn on n-type TFTs 92 and 93 as well as n-type TFT 901 (seventh switching). Therefore, liquid crystal display element 1102 and capacitor 1103 are connected to either pixel signal line 3 or common line 1012 depending on the on or off states determined by the voltage on control capacitor element 21, and are recharged to the predetermined state. Therefore, the change in reflectance (brightness) can be small owing to the low power consumption, and the lowering of display quality such as flicker and low contrast can be prevented. In the normal mode, vertical scanning line 1010 simultaneously controls TFT 1101 and n-type TFT 91, and a positive voltage pulse is applied to vertical scanning line 1010 to select the pixels on one horizontal line so that TFTs 1101 and n-type TFTs 91 on the selected horizontal line are turned on. The signal on horizontal scanning line 1 rises simultaneously with the rising of the positive voltage pulse on vertical scanning line 1010, and second n-type TFT 22 is also turned on so that liquid crystal display element 1102 and capacitor 1103 are connected to pixel signal line 3. Since pixel signal line 3 is supplied with the voltage pulse changing stepwise with time as shown in FIG. 8, the voltages on liquid crystal display element 1102 and capacitor 1103 also change in accordance with the stepwise change. When the signal on horizontal scanning line 1 changes from the positive voltage to the zero or negative voltage, second n-type TFT 22 is turned off to disconnect liquid crystal display element 1102 and capacitor 1103 from pixel signal line 3. The voltages on liquid crystal display element 1102 and capacitor 1103 are fixed to the voltage, which was appeared at the time of disconnection, and the pixel exhibits the reflectance corresponding to this voltage so that the reflectance corresponding to the levels of the stepwise voltage can be produced in accordance with the timing of changing the signal on horizontal scanning line 1 to the zero or negative voltage.

As described above, the eighth embodiment can achieve an effect similar to that of the sixth embodiment already described. Further, n-type TFTs 92 and 901 (fourth and seventh switching units) form a dual gate, and n-type TFTs 93 and 901 (sixth and seventh switching units) form a dual gate. Thus, n-type TFT 901 (seventh switching unit) is commonly used. Owing to this common use, dual gate structures can include n-type TFT 92 (fourth switching unit) and n-type TFT 93 (sixth switching unit) for preventing current leakage from liquid crystal display element 1102 while reducing the space required.

Ninth Embodiment

Figure 12:
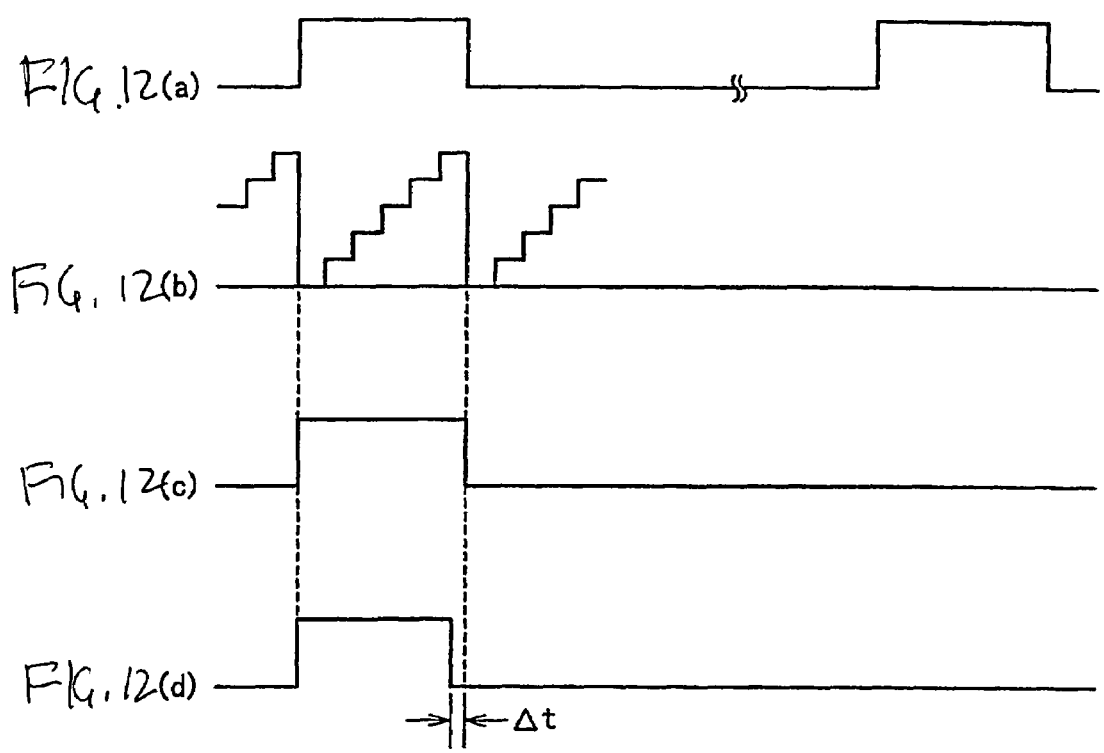
FIGS. 12(a), 12(b), 12(c), and 12(d) are waveform diagrams showing drive waveforms of a liquid crystal display device according to a ninth embodiment of the invention.

FIGS. 12(a), 12(b), 12(c), and 12(d) are waveform diagrams showing a ninth embodiment. For simplicity reason, only portions of waveforms are shown in FIGS. 12(b), 12(c) and 12(d).

Figure 13:
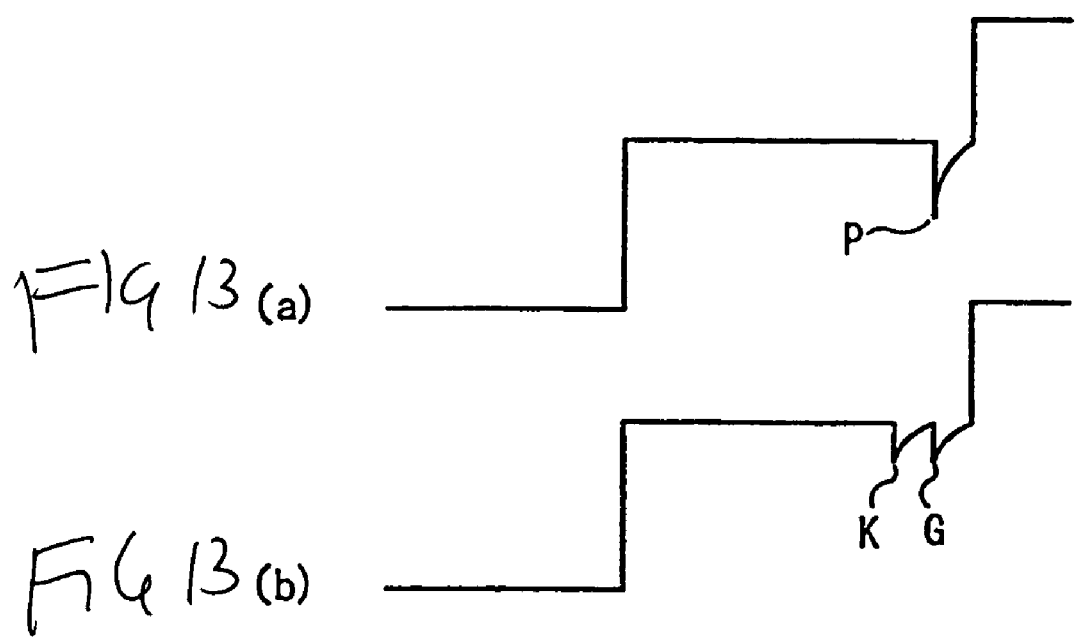
FIGS. 13(a) and 13(b) are waveform diagrams showing a drive waveform of the liquid crystal display device according to the ninth embodiment of the invention.
Figure 14:
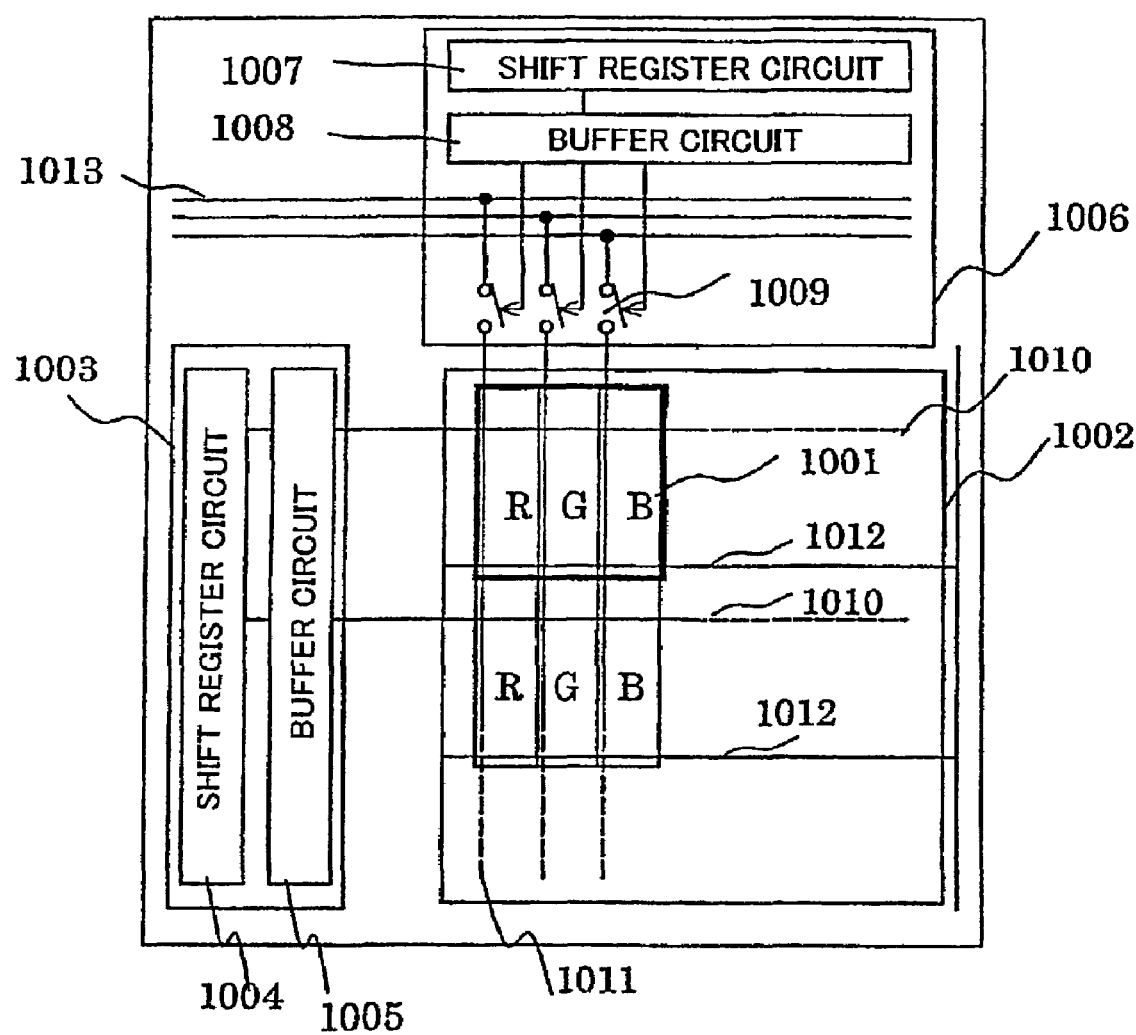
FIG. 14 shows a structure of a drive circuit of a liquid crystal display device in the prior art.
Figure 15:
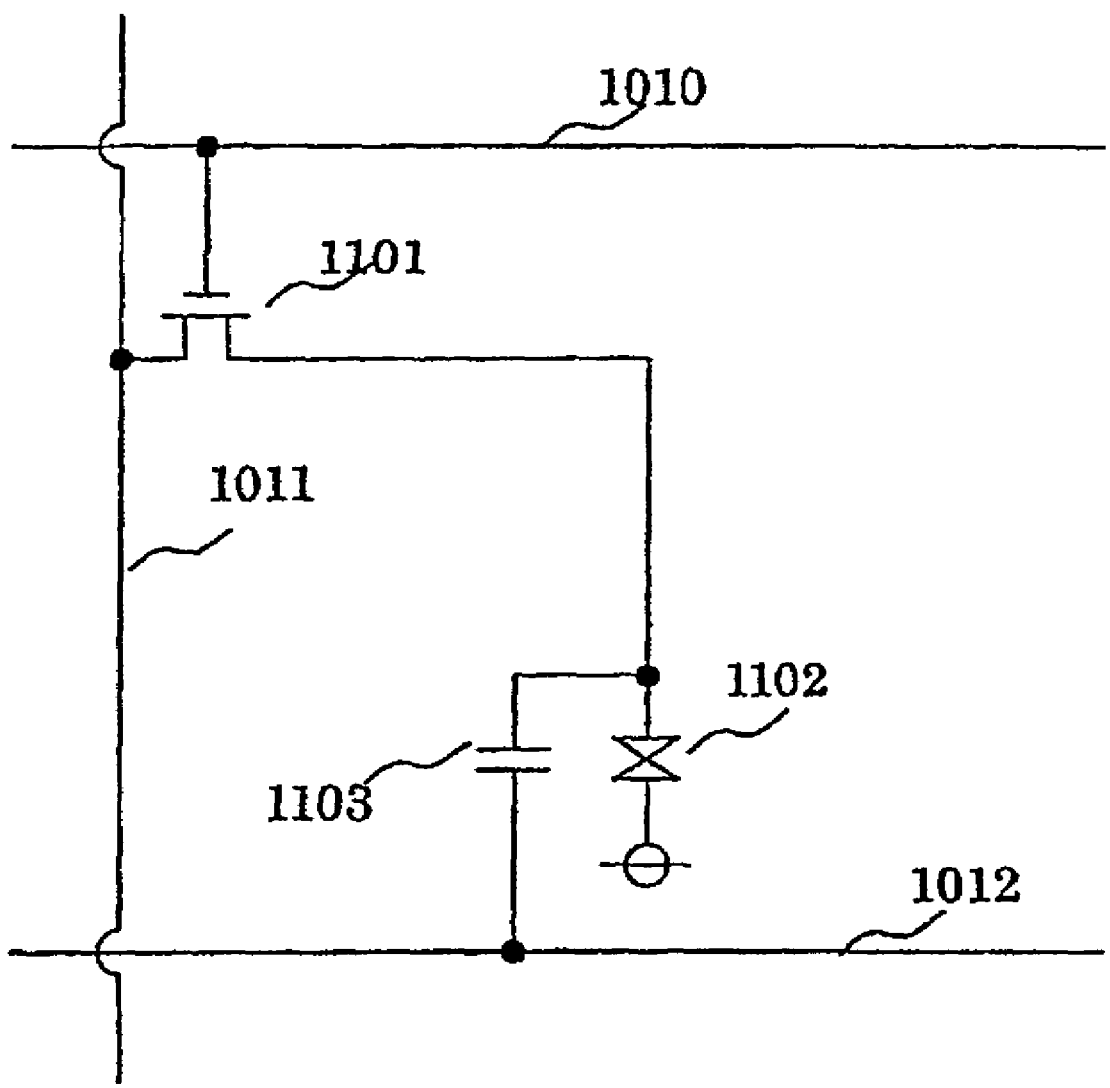
FIG. 15 is a circuit diagram showing the drive circuit of the liquid crystal display device in the prior art.

As shown in a waveform diagram (FIGS. 8(a)–8(e), showing the normal mode in the fifth embodiment, pixel signal line 3 carries a voltage pulse changing stepwise with time as shown in FIG. 12(b). Waveforms shown at in FIGS. 12(a) and 12(b) are the same as those in FIGS. 8(a) and 8(b), respectively. FIGS. 13(a) and 13(b) show, on an enlarged scale, a portion A of the stepwise voltage pulse at in FIG. 12(b). As shown in FIG. 13(a), level does not perform stepwise rising from a voltage level corresponding and 13(b), the voltage level does not rise stepwise from a voltage level corresponding to a certain display level or tone to a voltage level corresponding to a next display level, but exhibits, as shown in FIG. 13(a), a steep voltage drop P as a result of the change which occurs in voltage on horizontal scanning line 1 from the positive voltage to the zero or negative voltage due to the capacitive couplings between pixel signal line 3 and the plurality of crossing horizontal scanning lines 1. This voltage drop changes the voltage level applied to the liquid crystal, and thus lowers the quality of multi-level display. If the plurality of horizontal scanning lines 1 simultaneously change from the positive voltage to zero or a negative voltage (e.g., if all the pixels on one row perform the display at the same level), the capacitive coupling, which is present between pixel signal line 3 and each of the crossing horizontal scanning lines 1, is added so that the above steep voltage drop occurs. In view of this, the ninth embodiment is configured such that the voltage pulse, which is applied to horizontal scanning line 1 in each of the odd-numbered columns, as shown in FIG. 12(c), changes to the zero or negative voltage in accordance with the timing shifted by a predetermined time At from the change of the voltage pulse for each of the even-numbered columns, as shown in FIG. 12(d). This reduces the number of capacitive couplings, which act on pixel signal line 3 at the same time, and thereby substantially reduces the steep voltage drop by half. In connection with the above operation, K in FIG. 13(b) indicates the lowering of the voltage level, which is caused by the capacitive coupling between pixel signal line 3 and horizontal scanning line 1 in each of the odd-numbered columns, and G in FIG. 13(b) indicates the lowering of the voltage level, which is caused by the capacity coupling between pixel signal line 3 and horizontal scanning line 1 in each of the even-numbered columns. As can be seen therefrom, the number of horizontal scanning lines is reduced by half by dividing the horizontal scanning lines into the odd-numbered lines and even-numbered lines. Therefore, the sum of the capacitive couplings for each line group can be reduced by half, and the variation in voltage level is reduced by half so that lowering of the image quality can be suppressed.

INDUSTRIAL APPLICABILITY

The invention can be used as an image display device using liquid crystal, and particularly is suitable to a portable terminal such as a mobile telephone requiring lowering of power consumption.

What is claimed is:
1. A liquid crystal display device comprising:
 a plurality of first and second vertical scanning lines and a plurality of horizontal scanning lines arranged on a substrate in a matrix form;
 a pixel signal line arranged on the substrate proximate the first vertical scanning lines; and a plurality of pixels, each pixel being located at a crossing point of corresponding first and second vertical scanning lines and a corresponding horizontal scanning line, each pixel including a pixel element changing in light interaction characteristics in response to a potential applied to a pixel electrode of the pixel element, a first switching unit connected to the corresponding horizontal scanning line and switched in response to a signal applied to the corresponding first vertical scanning line, a control capacitor element for receiving and holding a control signal from the corresponding horizontal scanning line, when connected to the corresponding horizontal scanning line by the first switching unit, a second switching unit selectively connecting the pixel signal line to the pixel electrode to write the potential on the pixel signal line onto the pixel element, the second switching unit being connected to the control capacitor element and being switched by the potential on the control capacitor element, a third switching unit selectively connecting a reference line to the pixel electrode to write the potential on the reference line onto the pixel element, the third switching unit being connected to the control capacitor element and being switched by the potential on the control capacitor element, the second and third switching units having complementary states in response to a potential on the control capacitor element, and a fourth switching unit switched by a potential on the corresponding second vertical scanning line and connected in series between the pixel electrode and each of the second and third switching units.

2. The liquid crystal display device according to claim 1, wherein the second switching unit includes an n-type thin film transistor (TFT) and the third switching unit includes a p-type TFT.

3. The liquid crystal display device according to claim 2, wherein a time interval between writing operations for a respective pixel electrode is shorter than a time interval between writing operations for the respective control capacitor element.

4. The liquid crystal display device according to claim 1, wherein a time interval between changes of the potential on the pixel signal line between opposite sides of a potential on an opposed substrate is longer than a time interval between writing operations for the respective pixel electrodes.

5. The liquid crystal display device according to claim 1, including a drive circuit connected to the second vertical scanning lines, dividing a row of externally supplied time-series binary control signals into signals corresponding to respective pixels such that a control signal corresponding to a respective pixel electrode can be held until completion of writing of the potential on the pixel signal line to the respective control capacitor elements.

6. The liquid crystal display device according to claim 1, wherein a reference potential on the pixel signal line is set such that a potential written into a respective pixel electrode through the corresponding second switching unit is equal to a value obtained by adding or subtracting a liquid crystal drive voltage to or from a potential on an opposed substrate, and a potential on a common line is set such that the potential written into the pixel electrode by the second switching unit is equal to the potential on the opposed substrate.

7. The liquid crystal display device according to claim 1, including a reference potential switching unit connecting the pixel signal line to a reference potential bus line for externally supplying a reference potential to the device, and the reference potential switching unit operates together with the first vertical scanning lines.

8. The liquid crystal display device according to claim 1, wherein the pixel electrode for each pixel is divided into a plurality of pixel sub-electrodes, and including respective first switching units, control capacitor elements, and second switching units for each of the pixel sub-electrodes.

9. The liquid crystal display device according to claim 8, wherein at least one of the pixel sub-electrodes has an area different from areas of other pixel sub-electrodes.

10. The liquid crystal display device according to claim 1, wherein each pixel electrode includes a metal film, and is reflective.

11. A liquid crystal display device comprising:

a plurality of first, second, and third vertical scanning lines and a plurality of horizontal scanning lines arranged on a substrate in a matrix form;

a pixel signal line arranged on the substrate proximate the first vertical scanning lines; and a plurality of pixels, each pixel being located at a crossing point of corresponding first, second, and third vertical scanning lines and a corresponding horizontal scanning line, each pixel including a pixel element changing in light interaction characteristics in response to a potential applied to a pixel electrode of the pixel element, a first switching unit connected to the corresponding horizontal scanning line and switched in response to a signal applied to the corresponding first vertical scanning line, a control capacitor element for receiving and holding a control signal from the corresponding horizontal scanning line, when connected to the corresponding horizontal scanning line by the first switching unit, a second switching unit selectively connecting the pixel signal line to the pixel electrode to write the potential on the pixel signal line onto the pixel element, the second switching unit being connected to the control capacitor element and being switched by the potential on the control capacitor element, a third switching unit selectively connecting a reference line to the pixel electrode to write the potential on the reference line onto the pixel element, the third switching unit being connected to the control capacitor element and being switched by the potential on the control capacitor element, the second and third switching units having complementary states in response to a potential on the control capacitor element, a fourth switching unit switched by a potential on the corresponding second vertical scanning line and connected in series between the second switching unit and the pixel electrode, and a fifth switching unit switched by a potential on the corresponding third vertical scanning line and connected in series between the the third switching unit and the pixel electrode.

12. The liquid crystal display device according to claim 11, wherein the pixel electrode for each pixel is divided into a plurality of pixel sub-electrodes, and including respective first switching units, control capacitor elements, and second switching units for each of the pixel sub-electrodes.

13. The liquid crystal display device according to claim 12, wherein at least one of the pixel sub-electrodes has an area different from areas of the other pixel sub-electrodes.

14. The liquid crystal display device according to claim 11, wherein each pixel electrode includes a metal film, and is reflective.

15. The liquid crystal display device according to claim 11, wherein the second switching unit includes an n-type thin film transistor (TFT) and the third switching unit includes a p-type TFT.

16. A liquid crystal display device comprising:
a plurality of first and second vertical scanning lines and a plurality of horizontal scanning lines arranged on a substrate in a matrix form;
a pixel line arranged on the substrate proximate the first vertical scanning lines; and
a plurality of pixels, each pixel being located at a crossing point of corresponding first and second vertical scanning lines and a corresponding horizontal scanning line, each pixel including
a pixel element changing in light interaction characteristics in response to a potential applied to a pixel electrode of the pixel element,
a first switching unit connected to the corresponding horizontal scanning line and switched in response to a signal applied to the corresponding first vertical scanning line,
a control capacitor element for receiving and holding a control signal from the corresponding horizontal scanning line, when connected to the corresponding horizontal scanning line by the first switching unit,
a second switching unit selectively connecting the pixel signal line to the pixel electrode to write the potential on the pixel signal line onto the pixel element, the second switching unit being connected to the control capacitor element and being switched by the potential on the control capacitor element,
a third switching unit selectively connecting a reference line to the pixel electrode to write the potential on the reference line onto the pixel element, the third switching unit being connected to the control capacitor element and being switched by the potential on the control capacitor element, the second and third switching units having complementary states in response to a potential on the control capacitor element,
a fourth switching unit switched by a potential on the corresponding first vertical signal line and connected in series between the the second switching unit and the pixel electrode,
a fifth switching unit switched by a potential on the corresponding second vertical scanning line and connected in series between the the third switching unit and the pixel electrode, and
a sixth switching unit connected in parallel with the fourth switching unit and switched by a potential on the corresponding second vertical scanning line.

17. The liquid crystal display device according to claim 16, including a seventh switching unit switched by a potential on the second vertical scanning line and connected in series between the pixel electrode and the fifth and sixth switching units.

18. The liquid crystal display device according to claim 17, wherein the second switching unit includes an n-type thin film transistor (TFT) and the third switching unit includes a p-type TFT.

19. The liquid crystal display device according to claim 16, wherein the second switching unit includes an n-type thin film transistor (TFT) and the third switching unit includes a p-type TFT.

* * * * *